Patented Jan. 2, 1934

1,942,104

UNITED STATES PATENT OFFICE 1,942,104

PROCESS OF EXTRACTING ROTENONE FROM PLANT MATERIAL

Howard A. Jones, Washington, D. C., dedicated to the free use of the Government and the people No Drawing. Application February 20, 1933
Serial No. 657,686

4 Claims. (Cl. 260—123)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the people of the United States.

This invention relates to a compound made from a chemical combination of rotenone and carbon tetrachloride. The object of my invention is extracting plant material containing rotenone with carbon tetrachloride to produce this compound which has highly valuable properties as an insecticide, and mothproofing agent.

This compound contains 71.9 per cent by weight of rotenone and 28.1 per cent by weight of carbon tetrachloride. This represents a molecular proportion of 1 molecule of rotenone to 1 molecule of carbon tetrachloride. The empirical formula of this addition compound of rotenone and carbon tetrachloride therefore is $C_{23}H_{22}O_6 \cdot CCl_4$. This compound would be classified in the art as an "addition compound." This compound may also be referred to as a "solvate", since it is a chemical combination of a compound (i. e. rotenone) with a solvent compound (i. e. carbon tetrachloride).

I have prepared this chemical compound and have found that it possesses distinctly different physical and chemical properties from those of both rotenone and carbon tetrachloride. The compound crystallizes in colorless, long, thin, rod-like crystals; while rotenone crystallizes in flat, hexagonal-shaped plates. This new compound is less soluble than rotenone.

I have found that the fusion of rotenone and carbon tetrachloride has resulted in a product possessing insecticidal properties different from those possessed by rotenone, acting alone, and carbon tetrachloride, acting alone. My compound also possesses mothproofing properties different from those of rotenone.

My invention may be prepared in several ways. It may be produced from rotenone by dissolving said rotenone in carbon tetrachloride and evaporating the solution to obtain a crystalline product therefrom, said product being my invention.

This addition compound of rotenone and carbon tetrachloride is also produced from the roots of plants of the genus Derris (Deguelia), roots of plants of the genus Lonchocarpus, roots of plants of the genus Spatholobus, or from any other plant material containing rotenone. This is accomplished by extracting any of the above-mentioned plant materials with carbon tetrachloride, evaporating the liquid extract to a small volume and cooling. The material which crystallizes out is substantially the product covered by my invention. My preferred method for the purification of the product thus obtained, is to dissolve it in hot carbon tetrachloride, cool the solution, and separate the material, which crystallizes out, by filtration or other similar means employed to separate substances.

The extraction method hereinafter more fully described, constitutes a new and improved means for obtaining a pure, crystalline compound having insecticidal properties which is derived from plant materials containing rotenone.

The methods of producing my compound are illustrated by the following examples:

*Example I.*—One gram of rotenone is dissolved in 50 cc. of carbon tetrachloride at a temperature of 50° C. This solution is allowed to cool to 20° C., when crystallization will occur. The crystalline material which separates is filtered off and dried in the air. The product so obtained is the pure addition compound of rotenone and carbon tetrachloride.

*Example II.*—Fifty grams of the roots of Derris (Deguelia) sp. (tuba root) is completely extracted in a continuous extractor with carbon tetrachloride. The extract is evaporated to a volume of 25 cc. and cooled in a refrigerator. When crystallization is complete the separated material is filtered, excess solvent removed by suction and the needle-like crystalline product dried in the air.

*Example III.*—Five kilograms of the roots of Lonchocarpus nicou (cube root) is percolated with 30 to 40 liters of carbon tetrachloride at a temperature of 50° C. The extract so obtained is evaporated to a volume of 1 liter. This evaporated extract is cooled until crystallization occurs. The separated material is filtered, excess solvent removed by suction and the crystalline mass dried in air.

The product obtained by the method outlined in Examples II and III is substantially the addition compound of rotenone and carbon tetrachloride in an impure state, but possesses insecticidal properties, and may be purified by the method outlined above without losing its insecticidal value.

While I have set forth in the above examples my preferred methods of obtaining this new product, I do not wish to be restricted to them.

Having thus fully described my invention, what I claim for Letters Patent is:

1. A process for making a chemical compound of rotenone and carbon tetrachloride which consists substantially in extracting the roots of plants of the genus Deguelia (Derris) with warm carbon tetrachloride, and crystallizing.

2. A process for making a chemical compound of rotenone and carbon tetrachloride which consists substantially in extracting the roots of plants of the genus Lonchocarpus with warm carbon tetrachloride, and crystallizing.

3. A process for making a chemical compound of rotenone and carbon tetrachloride which consists substantially in extracting the roots of plants of the genus Spatholobus with warm carbon tetrachloride, and crystallizing.

4. A process for making a chemical compound which consists substantially in extracting a plant material containing rotenone with warm carbon tetrachloride, and crystallizing.

HOWARD A. JONES.